United States Patent
Chan et al.

(10) Patent No.: US 12,443,510 B2
(45) Date of Patent: Oct. 14, 2025

(54) LOCALIZING VULNERABILITIES IN SOURCE CODE AT A TOKEN-LEVEL

(71) Applicant: MICROSOFT TECHNOLOGY LICENSING, LLC., Redmond, WA (US)

(72) Inventors: Aaron Yue-Chiu Chan, Provo, UT (US); Anant Girish Kharkar, Huntersville, NC (US); Yevhen Mohylevskyy, Redmond, WA (US); Kalpathy Sitaraman Sivaraman, Bothell, WA (US); Neelakantan Sundaresan, Bellevue, WA (US); Roshanak Zilouchian Moghaddam, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 214 days.

(21) Appl. No.: 18/208,619

(22) Filed: Jun. 12, 2023

(65) Prior Publication Data
US 2024/0411666 A1    Dec. 12, 2024

(51) Int. Cl.
    *G06F 11/362*    (2025.01)
(52) U.S. Cl.
    CPC ................ *G06F 11/3624* (2013.01)
(58) Field of Classification Search
    CPC ................ G06F 11/36; G06N 20/00
    See application file for complete search history.

(56) References Cited

U.S. PATENT DOCUMENTS

| | | |
|---|---|---|
| 11,381,590 B2 | 7/2022 | Alsaeed |
| 11,526,424 B2 | 12/2022 | Deng |
| 2006/0191010 A1 | 8/2006 | Benjamin |
| 2020/0057858 A1 | 2/2020 | Sharma |
| 2021/0157926 A1 | 5/2021 | Handurukande et al. |
| 2022/0083450 A1 | 3/2022 | Geddes et al. |
| 2023/0177170 A1 | 6/2023 | Olson |
| 2024/0028740 A1 | 1/2024 | Chan |
| 2025/0053501 A1* | 2/2025 | Ayyadurai ............. G06N 20/00 |
| 2025/0068743 A1* | 2/2025 | Rahman ................ G06F 21/552 |

FOREIGN PATENT DOCUMENTS

WO    2021231007 A1    11/2021

OTHER PUBLICATIONS

Chan, et al., "Transformer-based Vulnerability Detection in Code at EditTime: Zero-shot, Few-shot, or Fine-tuning?", arXiv:2306.01754v1, May 23, 2023, 10 pages.

(Continued)

*Primary Examiner* — Ziaul A Chowdhury
(74) *Attorney, Agent, or Firm* — Workman Nydegger

(57) ABSTRACT

A vulnerability detection and repair system utilize a classifier model to detect a software vulnerability in a source code snippet and the tokens in the source code snippet attributable to the vulnerability. A large language model is then given the vulnerable source code snippet, its vulnerability type, the vulnerability tokens, and a few-shot examples to determine whether or not the source code snippet includes the identified vulnerability. The few-shot examples include positive and negative samples of the type of vulnerability to guide the large language model towards the correct output.

20 Claims, 8 Drawing Sheets

(56) References Cited

OTHER PUBLICATIONS

International Search Report and Written Opinion received for PCT Application No. PCT/US2024/032331, mailed on Oct. 9, 2024, 12 pages.

Notice of Allowance mailed on Jul. 3, 2024, in U.S. Appl. No. 17/949,589, 11 pages.

Aghaei, et al., "Threatzoom: CVE2CWE using Hierarchical Neural Network", In Repository of arXiv:2009.11501v1, Sep. 24, 2020, 19 Pages.

Vaswani, et al., "Attention Is All You Need", In Repository of arXiv:1706.03762v5, Dec. 6, 2017, 15 Pages.

Verdi, et al., "An Empirical Study of C++ Vulnerabilities in Crowd-Sourced Code Examples", In Repository of arXiv:1910.01321v2, Jan. 19, 2021, 19 Pages.

Bhandari, et al., "CVEfixes: Automated Collection of Vulnerabilities and Their Fixes from Open-Source Software", In Repository of arXiv:2107.08760v1, Jul. 19, 2021, 10 Pages.

Das, et al., "V2W-BERT: A Framework for Effective Hierarchical Multiclass Classification of Software Vulnerabilities", In Repository of arXiv:2102.11498v1, Feb. 23, 2021, 11 Pages.

Devlin, et al., "BERT: Pre-training of Deep Bidirectional Transformers for Language Understanding", In Repository of arXiv:1810.04805v2, May 24, 2019, 16 Pages.

Lutellier, et al., "ENCORE: Ensemble Learning using Convolution Neural Machine Translation for Automatic Program Repair", In Repository of arXiv:1906.08691v1, Jun. 20, 2019, pp. 1-18.

"International Search Report and Written Opinion Issued in PCT Application No. PCT/US23/025487", Mailed Date: Sep. 7, 2023, 14 Pages.

Pearce, et al., "Asleep at the Keyboard? Assessing the Security of Github Copilot's Code Contributions", In Repository of arXiv:2108.09293v3, Dec. 16, 2021, 15 Pages.

Pearce, et al., "Can OpenAI Codex and Other Large Language Models Help US Fix Security Bugs?", In Repository of arXiv:2112.02125v1, Dec. 3, 2021, 16 Pages.

Sangaroonsilp, et al., "Common Privacy Weaknesses and Vulnerabilities in Software Applications", In Repository of arXiv:2112.13997v1, Dec. 28, 2021, 18 Pages.

\* cited by examiner

PROMPT 700

702 — You are a software vulnerability detector. Based on the source code snippet given by the user, determine whether or not there is a hardcoded-credential vulnerability present. Hardcoded-credentials are passwords, secrets or tokens stored in plaintext directly in the source code. Occurrences of client ids, application ids, usernames, or NAMES, not values, of secrets are not sensitive if no passwords, secrets, or tokens are also present. If you are not sure, say "Unsure". Otherwise, say "Yes" or "No".

704
    <Vulnerable Source Code #1>
    <No, not a hardcoded-credential since there is a name of a secret but not its value>

....

<Vulnerable Source Code #n>
    <Yes, there is a hardcoded-credential since the user harcoded their secret value, password or token>

706 — public const string AADApplicationClientSecret = FieldValidation: EmpGuideClientSecret

FIG. 7

LOCALIZING VULNERABILITIES IN SOURCE CODE AT A TOKEN-LEVEL

BACKGROUND

A source code bug is an error in a source code program that causes the program to behave in an unintended manner, such as producing erroneous results. There are various types of source code bugs. A functional bug is one where the program fails to perform in accordance with a functional description or specification. A compiler error is a type of software bug that fails to conform to the syntax of a programming language of the program. A runtime error occurs during runtime such as logic errors, I/O errors, undefined object errors, division by zero errors, etc.

A software vulnerability differs from source code bugs, such as functional bugs, compiler errors and runtime errors since they do not produce an erroneous result. By contrast, a software vulnerability is a programming defect that causes significant performance degradation, such as excessive resource usage, increased latency, reduced throughput, and overall degraded performance or is exploited for malicious intent. Software vulnerabilities are difficult to detect due to the absence of fail-stop symptoms. With the increased complexity of software systems, there is an emphasis on the efficient use of resources and system security and hence, improvements in detecting and remedying software vulnerabilities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A vulnerability detection system utilizes a classifier model to identify the type of vulnerability detected in a source code snippet and the tokens in the source code snippet attributable to the vulnerability. A large language model is then given the vulnerable source code snippet, its vulnerability type, the location of the tokens attributable to the vulnerability, and a few-shot examples to determine whether or not the source code snippet includes the identified vulnerability. The few-shot examples include positive and negative samples of the identified vulnerability type to guide the large language model towards the correct output.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 7 is a schematic diagram of an exemplary prompt for the large language model.

DETAILED DESCRIPTION

Overview

The present disclosure relates to the detection of a software vulnerability and the one or more tokens of a source code snippet attributable to the software vulnerability. In a first stage, a classifier model is used to identify token positions in the source code snippet that are associated with the type of the detected software vulnerability. In a second stage, a large language model is used to determine if the source code snippet contains the detected software vulnerability given the identified software vulnerability type and a few-shot examples having the same type of software vulnerability. When the large language model identifies the source code snippet as having the vulnerability, a repair code model is used to predict the repair for the vulnerable source code snippet.

Attention now turns to a more detailed description of the system, method, and components used in the vulnerability detection and repair system.

System

Figure 1:
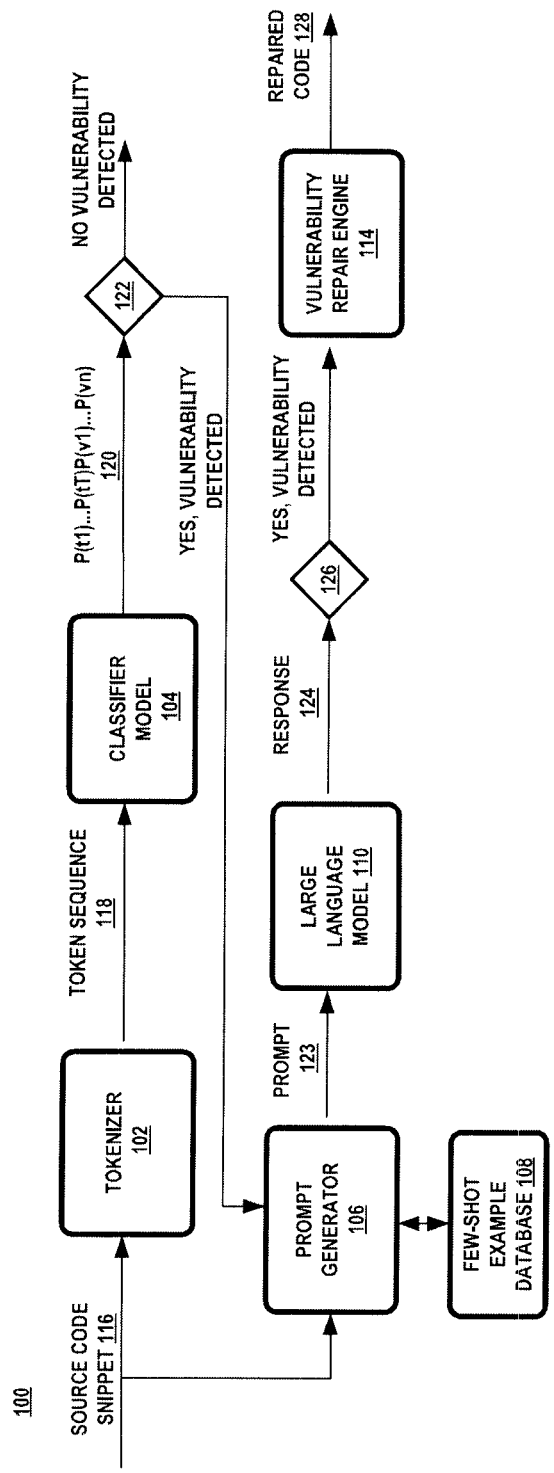
FIG. 1 is a schematic diagram illustrating an exemplary vulnerability detection and repair system.

FIG. 1 represents an exemplary vulnerability detection and repair system. In an aspect, the system 100 includes a tokenizer 102, a classifier model 104, a prompt generator 106, a few-shot example database 108, a large language model 110, and a vulnerability repair engine 114.

The tokenizer 102 accepts a source code snippet 116 and converts the source code snippet 116 into a sequence of tokens 118. The source code snippet 116 may consist of a source code program or a portion of a source code program, such as a method, expression, or line of source code. A token is a basic element of source code that cannot be subdivided. A token has an assigned meaning in the programming language of the source code. The tokenizer 102 may be a lexical analyzer or parser that reads a string of characters from the source code snippet and converts the string into a sequence of tokens.

The classifier model 104 receives the token sequence, as a sequence of token embeddings, and identifies a type of software vulnerability and positions in the token sequence that are associated with the type of software vulnerability. In an aspect, the token sequence consists of at most T tokens and can identify n types of software vulnerabilities. The classifier model generates an output probability for each class which consists of the t token positions and the n software vulnerabilities, $P(t_1, \ldots t_T), P(v_1, \ldots, P(v_n)$. When a probability exceeds a threshold, such as greater than 0.5, the associated token or vulnerability class is considered vulnerable. In an aspect, T is 512 tokens and n is 27 vulnerability classes. P(t) represents the probability of the token in position t and P(v) represents the probability of vulnerability class v.

In an aspect, the software vulnerabilities may include any one or more of the following which are identified by GitHub's CodeQL static analyzer: bind-socket-all-network interfaces; clear-text-logging; clear-text-storage-sensitive-data; clear-text-storage-file; client-side-unvalidated-url-redirection; code-injection; command-line-injection; conditionally-uninitialized-variable; flask-debug; hardcoded-credentials; incomplete-hostname-regexp; incomplete-url-substring-sanitization; insecure-randomness; insufficient-password-hash; overly-permissive-file; path-injection; reflected-xss; regex-injection; server-side-unvalidated-url-redirection; sizeof-ptr; sql-injection; ssrf; stack-trace-exposure; tarlip; unvalidated-url-redirection; weak-crypto-key; and weak-cryptographic-algorithm.

In an aspect, the classifier model 104 is a deep learning machine learning model trained to detect a type of software vulnerability in the source code at specific token positions in the source code snippet. A deep learning machine learning model differs from traditional machine learning models that do not use neural networks. Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes statistical techniques, data mining, Bayesian networks, Markov models, clustering, support vector machine, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. There are various types of deep learning models that generate source code, such as recurrent neural network (RNN) models, convolutional neural network (CNN) models, long short-term memory (LSTM) models, and neural transformers.

In one aspect, the classifier model 104 is a neural encoder transformer model with attention pre-trained on an unsupervised dataset of source code samples and fine-tuned on a supervised dataset of labeled samples of source code containing vulnerable and non-vulnerable source code. The neural encoder transformer model is trained to identify the likelihood that the source code contains a particular type of software vulnerability and the positions of the tokens associated with the vulnerability.

A neural transformer model with attention utilizes an attention mechanism. Attention is used to decide which parts of the input sequence are important for each token, especially since the encoder is limited to encoding a fixed-size vector. Attention mechanisms gather information about the relevant context of a given token and then encode that context into a vector which represents the token. It is used to identify the relationships between tokens in the long sequence while ignoring other tokens that do not have much bearing on a given prediction.

The attention mechanism indicates how much attention a particular input should pay to other elements in a given input sequence. The attention mechanism can be implemented in a self-attention layer of the model. In the self-attention layer, each token in an input sequence is transformed into a query (Q), key (K), and value (V) that are used to calculate a score that indicates how much attention that particular token should attend to other tokens in the input sequence. The self-attention layers are integrated into the encoder neural encoder transformer model with attention.

The attention mechanism used in a neural encoder transformer model with attention is a self-attention layer that precedes the neural network layer. The self-attention layer attends to both the right and left of the token being calculated.

In the case where the neural encoder transformer identifies the source code snippet as having an identified type of software vulnerability 122—yes, the system uses a large language model 110 to identify the vulnerability. The large language model 110 is a deep learning model that contains billions of parameters. Parameters are the parts of the model 110 learned from the training datasets that define the skill of the model to generate predictions for a target task. In an aspect, the large language model is a unified cross-modal neural transformer model with attention. A unified cross-modal neural transformer model with attention is a type of neural transformer model that is pre-trained on multi-modal contents, such as natural language text and source code to support various code-related tasks. The large language model may be implemented as a neural transformer model with attention in an encoder-decoder configuration or in a decoder-only configuration.

In an aspect, the large language model 110 may be hosted in a remote server whose access is offered as a service. Access to the large language model may be given through application programming interfaces (APIs). Examples of the large language model include the Chat GPT model of OpenAI or other GPT models that are offered as a service.

The use of the neural encoder transformer model with attention and the large language model to detect a software vulnerability is beneficial since software vulnerabilities are difficult to detect. The classifier model is trained to determine the location of the software vulnerability and to identify the type of vulnerability. However, the classifier model is a low-precision model due to its limited context length. The large language model is able to accommodate a larger context length or prompt size which allows the model to view a larger portion of the source code and a few-shot examples that include positive and negative samples. The few-shot examples guide the large language model towards the correct output.

Furthermore, the vulnerability detection system is deployed in target environments that require extreme high-precision accuracy since the system is automatically alerting developers to vulnerabilities. False negatives are preferred over false positives because false positives can quickly lead developers to ignore warnings if they are repeatedly incorrect. For this reason, the system encompasses a two-stage vulnerability detection process to ensure that the detected vulnerable is accurate.

When the classifier model identifies a vulnerability, the prompt generator 106 generates a prompt 123 for the large language model 110 which includes the source code snippet 116 having the identified vulnerability type and a few-shot examples.

A few-shot example consists of a source code snippet having an identified software vulnerability type and token positions in the source code snippet identified as being associated with the software vulnerability type. The few-shot examples are used to guide the large language model on the vulnerability detection task. The few-shot examples are obtained from a few-shot example database 108 which stores positive and negative samples for each vulnerability type. A positive sample includes a source code snippet having an identified vulnerability and a negative sample includes a source code snippet without an identified vulnerability. In an aspect, the few-shot example database 108 may include a template for each vulnerability type that includes positive and negative samples.

The large language model 110 provides a response 124 which indicates whether or not the source code snippet contains the software vulnerability type. When the response indicates a software vulnerability 126—yes, a vulnerability repair engine 114 is used to generate the source code to repair the source code snippet having the identified vulnerability 128.

In an aspect, the vulnerability repair engine is a deep learning model trained on source code to generate repaired code. The deep learning model may be configured as a neural transformer model with attention in an encoder-decoder configuration or in a decoder-only configuration. In the encoder-decoder configuration, the model performs a sequence-to-sequence task that translates the vulnerable source code snippet into the repaired code. The repaired code corrects the vulnerability in the source code snippet. In the decoder-only configuration, the model generates the repaired code as an autoregression task, predicting each token of the repaired code one at a time based on the preceding tokens of the repaired code.

Figure 2:
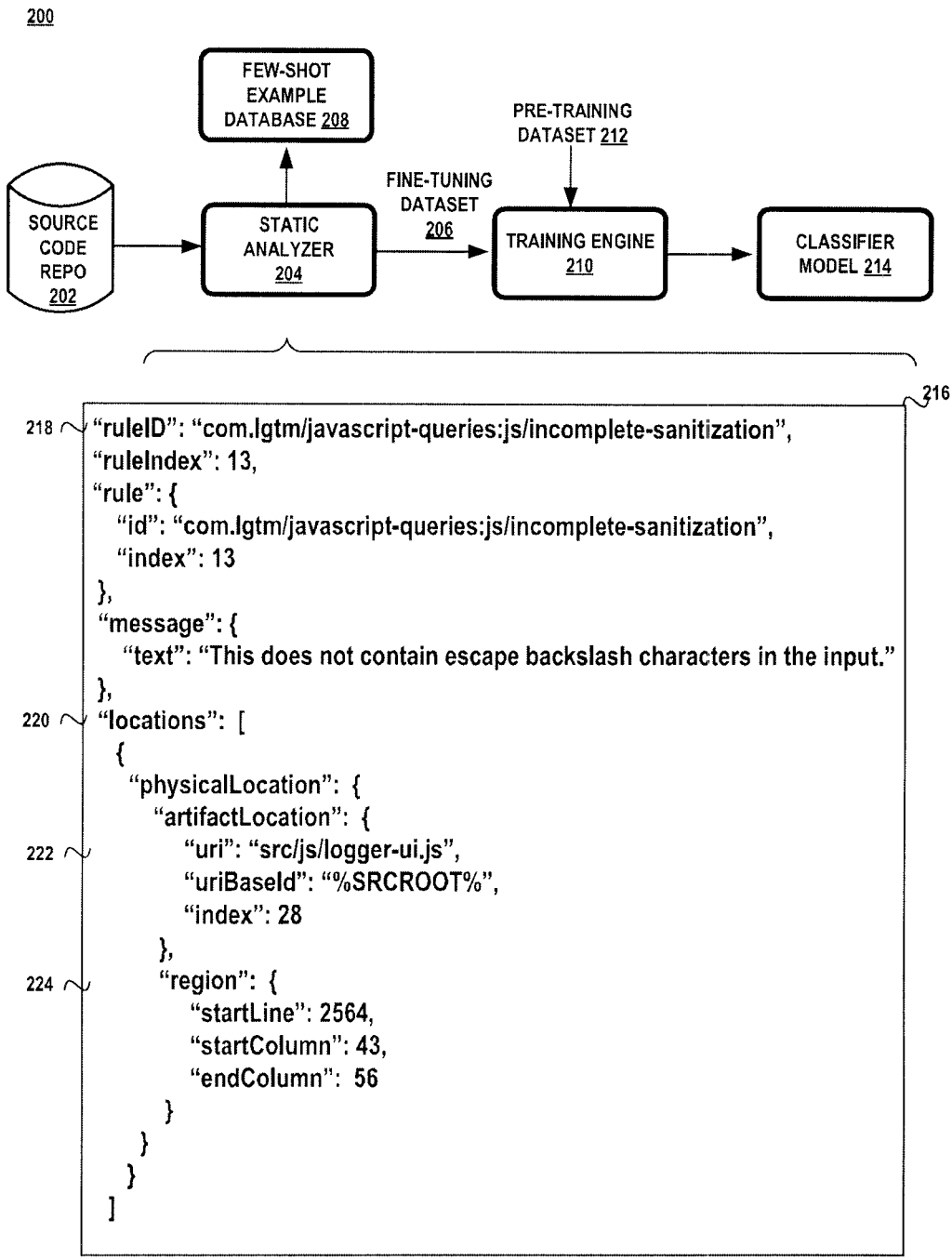
FIG. 2 is a schematic diagram illustrating a system for training a classifier model to detect a type of software vulnerability and the associated tokens in a source code snippet.

FIG. 2 illustrates an exemplary system 200 for training the classifier model 214. The classifier model 214 is pre-trained on unsupervised source code snippets 212 and then fine-tuned with a supervised training dataset consisting of labeled samples of vulnerable and non-vulnerable samples 206. The unsupervised source code snippets are extracted from a source code repository and are used by the training engine 210 to train the classifier model 214 to recognize source code. Fine-tuning is the process where the model's parameters are learned or updated from supervised data. Pre-training and fine-tuning are both training processes but differ in the type of training data used. A supervised dataset contains labeled data that is tagged with the correct answer, whereas an unsupervised dataset learning uses unlabeled data.

A static analyzer 204 is used to analyze various source code programs from a source code repository or codebase 202 in order to generate the fine-tuning dataset 206. The fine-tuning dataset 206 includes source code samples having a known type of vulnerable and source code samples without a vulnerability. The training engine 210 applies the training dataset to the classifier model 214.

The static analyzer 204 discovers software vulnerabilities over a codebase or source code repository 202. The static analyzer 204 does not execute the source code to discover the software vulnerability instead relies on a static analysis. Examples of a static analyzer include, without limitation, Infer, CodeQL, source code security analyzers (i.e., BASH, dotTEST, etc.), and the like. A compiler differs from a static analyzer since the compiler detects syntax errors which differ from a software vulnerability.

Facebook® Infer is an interprocedural static code analyzer that is based on separation logic that performs Hoare-logic reasoning about programs that mutate data structures. Infer uses the analysis language, Smallfoot Intermediate Language (SIL), to represent a program in a simpler instruction set that describes the program's actions on a symbolic heap. Infer symbolically executes the SIL commands over a symbolic heap according to a set of separation logic proof rules in order to discover program paths with the symbolic heap that violate heap-based properties. Infer discovers software vulnerabilities consisting of null pointer exceptions, resource leaks, annotation reachability, missing lock guards, and concurrency race conditions.

CodeQL is a static analysis tool that runs on a codebase or repository. CodeQL creates a CodeQL database for the codebase and contains information on each code's syntactic structure, data flow, and control flow. CodeQL monitors the compilation process of a codebase and extracts information about the code, such as, the syntactic data from an abstract syntax tree of each code, and semantic data about name binding and type information. A set of queries is run on the CodeQL database to search for these artifacts from the database. Each query or group of queries is written to identify patterns of specific vulnerability types. A list of code errors or vulnerabilities within that codebase is generated from the queries. CodeQL identifies software vulnerabilities, such as null dereference, uninitialized variables, hardcoded credential, and SQL injections.

The output of CodeQL and other static analyzers is in the Static Analysis Results Interchange Format (SARIF). As shown in FIG. 2, an exemplary SARIF output from CodeQL in the SARIF format 216 is shown from which samples of training data are extracted to fine-tune the classifier model. The ruleid field 218 indicates the type of vulnerability, such as "incomplete sanitization." The locations field 220 contains a URI field 222 and a region field 224. The region and URI fields specify which part of the code contains the vulnerable tokens associated with the identified vulnerability. In this example SARIF 216, the vulnerable code starts on line 2564 ("startLine": 2564) and encompasses the tokens from column 43 through column 56 ("startColumn": 43, "endColumn": 56) of the source code file, src/js/logger-ui.js ("uri": "src/js/logger-ui.js").

Additional training samples are generated that include source code that the static analyzer indicates as not having a software vulnerable. The vulnerable samples and the non-vulnerable samples are labeled respectively and stored in the few-shot example database 208.

Figure 3A:
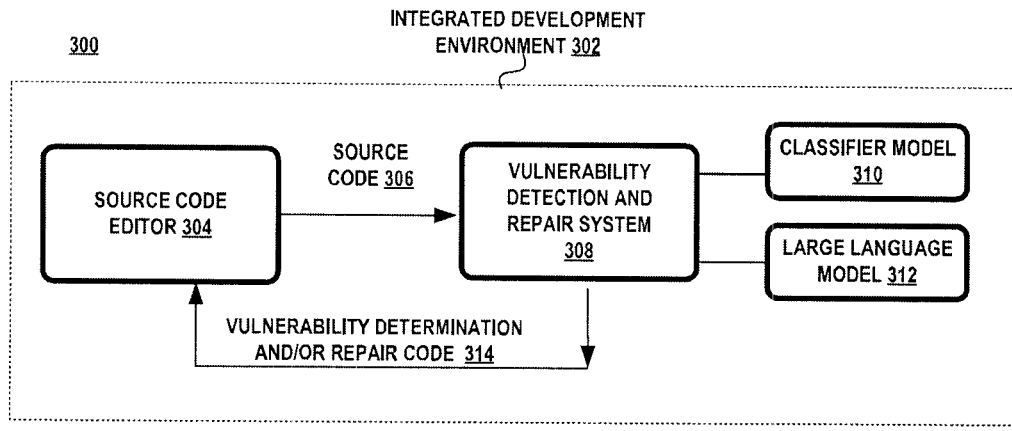
FIGS. 3A-3B are schematic diagrams illustrating exemplary applications of the vulnerability detection and repair system.
Figure 3B:
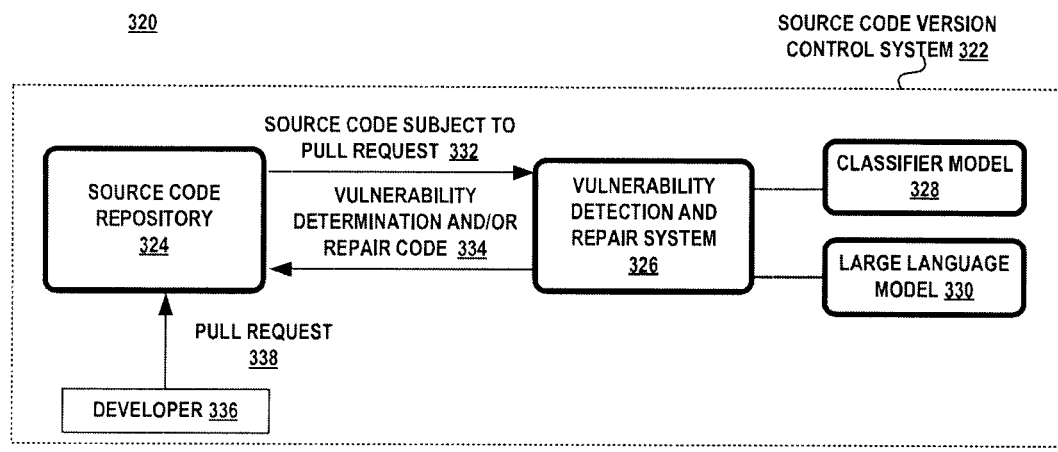

FIGS. 3A and 3B illustrate exemplary systems utilizing the vulnerability detection and repair system. Turning to FIG. 3A, there is shown a system 300 where the vulnerability detection and repair system 308 operates within an integrated development environment (IDE) 302. The IDE 302 is a software development tool that provides tools for software development, such as without limitation, source code editors, compilers, debuggers, build automation tools, and the like. The vulnerability detection and repair system 308 receives a request from a source code editor 304 to check a source code snippet for a vulnerability. The vulnerability detection and repair system 308 analyzes the predicted source code snippet 306 for software vulnerabilities using the classifier model 310 and the large language model 312 and optionally, generates a repair for the identified vulnerability. A vulnerability notification is sent to the source code editor 304 along with a repaired source code snippet, if vulnerable code is detected 314.

FIG. 3B illustrates a system 320 where the vulnerability detection and repair system 326 operates within a source code version control system 322 to identify vulnerabilities in the source code of a pull request 338 submitted by a developer 336 to a source code repository 324. The source code version control system 322 detects a pull request 338 and initiates a request 332 for the vulnerability detection and repair system 326 to analyze the source code subject to the pull request 338 for a software vulnerability. The system 326 notifies the source code repository 324 of its findings and returns a suggested repair upon finding a software vulnerability 334.

Attention now turns to a more detailed description of the classifier model. In one embodiment, the classifier model is constructed as a neural encoder transformer with attention. The neural encoder transformer with attention is better suited for classification tasks due to the type of attention used in the encoder. The encoder uses bi-directional attention which enables the encoder to learn the relationships of the tokens in an input sequence both before and after their occurrence. Classifiers are trained to interpret a model's internal representation into a class label. Since bi-directional attention allows the model's internal representation to depend on all other tokens, and not just the previous tokens, bi-directional attention leads to superior classification performance.

It should be noted that the phrase neural encoder transformer and neural encoder transformer model, neural encoder transformer with attention are used interchangeably.

Figure 4:
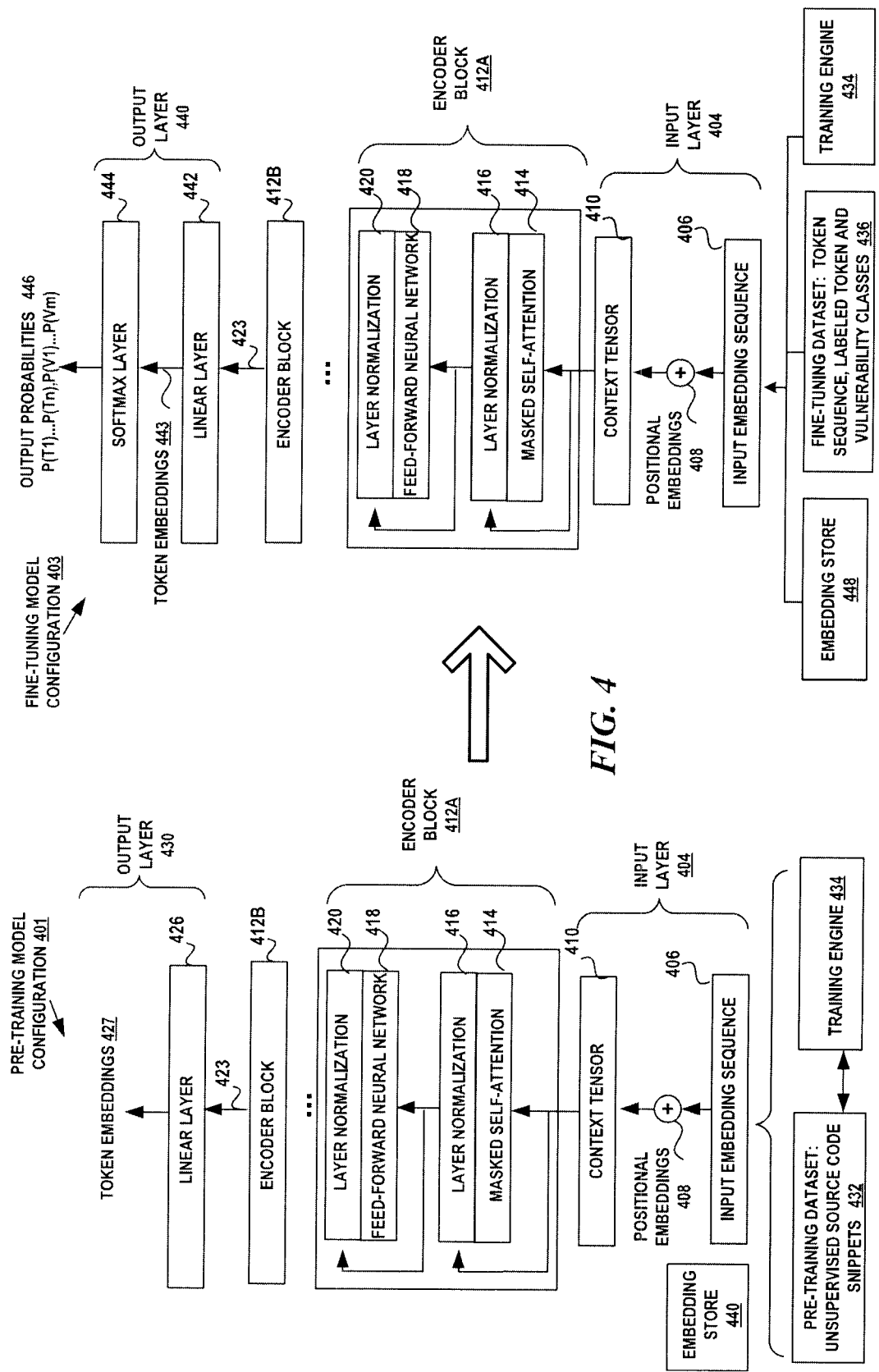
FIG. 4 is a schematic diagram illustrating an exemplary configuration of the classifier model as a neural encoder transformer model with attention in the training and fine-tuning configurations.

FIG. 4 illustrates an exemplary neural encoder transformer model. In pre-training 401, the neural encoder transformer model learns to understand source code, the relationship between the different code elements, and the syntax of a programming language. The weights of the model (e.g., token embeddings, attention weights (K,V,Q)) are initialized randomly and changed during pre-training based on the samples in the pre-training dataset 432. The weights of the model are optimized based on reducing a cost function. A training engine 434 uses a pre-training dataset of unsupervised source code samples 432 to pre-train the model for the optimal weights. During fine-tuning 403, the weights computed from the pre-training are used as the initial weights and tuned for the fine-tuning task. The training engine 434 uses a fine-tuning dataset 436 composed of vulnerable source code and non-vulnerable source code and a label that identifies the class or type of the vulnerability.

The neural encoder transformer 401 includes an input layer 404, one or more encoder blocks 412A-412B, and an output layer 430. The input layer 404 includes input embeddings of an input sequence of the pre-training dataset 432 and positional embeddings 408 that represents an order of the tokens in an input embedding sequence. The input embedding sequence 406 and the positional embeddings 408 are combined to form a context tensor 410.

An encoder block (412A-412B) consists of two layers. The first layer includes a masked self-attention component 414 followed by a layer normalization component 416. The second layer includes a feed-forward neural network 418 followed by a layer normalization component 420. The context tensor 410 is input into the masked self-attention layer 414 of the encoder block with a residual connection to layer normalization 416. The output of the layer normalization 416 is input to the feed-forward neural network 418 with another residual connection to layer normalization 420. The output of each encoder block (412A-412B) is a set of hidden representations 423. The set of hidden representations 423 is then sent through additional encoder blocks, if multiple encoder blocks exist.

Attention is used to decide which parts of the input sequence are important for each token, especially when decoding long sequences since the encoder is limited to encoding a fixed-size vector. Attention mechanisms gather information about the relevant context of a given token and then encode that context into a vector which represents the token. It is used to identity the relationships between tokens in the long sequence while ignoring other tokens that do not have much bearing on a given prediction.

The masked self-attention component 414 takes a context tensor 410 and weighs the relevance of each token represented in the context tensor to each other by generating attention weights for each token in the input embedding sequence 406. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with $d_v$ output values which are concatenated to a final value:

MultiHead($Q,K,V$)=Concat(head$_1$, . . . ,head$_h$)$W^O$, where head$_i$=Attention($QW_i^Q, KW_i^K, VW_i^V$), with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural encoder transformer, layer normalization is used between the layers. The layer normalization component normalizes the inputs across the features. The mean and standard deviation is computed across the feature dimensions. There is a first layer normalization 416 that precedes the feed-forward neural network 418 and a second layer normalization 420 that follows the feed-forward neural network 418. The feed-forward neural network 418 processes each output encoding separately. The output of the top encoder block is a set of attention vectors K and V 423 that represent the last hidden layer.

In the pre-training model configuration 401, the output layer 430 includes a linear layer 426 from which the token embeddings 423 are output. For fine-tuning, the neural encoder transformer model contains the same structure as the pre-trained model configuration except for the addition of a different output layer 440. The output layer of the pre-trained model is replaced with a classification layer that learns a new weight matrix of dimension K×H from randomly-initialized values, where K is the number of classes in the classification task and where H is the dimension of the output of last encoder block.

The output layer of the pre-trained model 430 is not used since its weight matrix is of a different size that may not contain the classes of the target classification task. Instead, the new output layer 440 is used which has the number of hidden units set to the number of classes K of the fine-tuning classification task with a softmax activation function 444. The predicted probability P for the j-th class given an output of last encoder block x and weight matrix W corresponding to the classification layer is as follows:

$P(y=j|x) = \exp(x^T W_j + b) / [\Sigma_{k=1 \ldots K} \exp(x^T W_k + b)]$, where K is the number of classes, W is the weight matrix of dimension K×H, H is the dimension of x, the output of last encoder block, and b is the bias value.

The output layer 440 consists of a linear layer 442 and a softmax layer 444. The linear layer 442 is a fully-connected neural network that projects the raw scores output by the last layer of the neural network into a logits vector. The softmax layer 444 applies the softmax function to the logits vector to compute a vector that represents the probability distribution 446 of the token position classes, $t_1, \ldots t_T$, and the vulnerability type classes, $V_1, \ldots, V_n$.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 5:
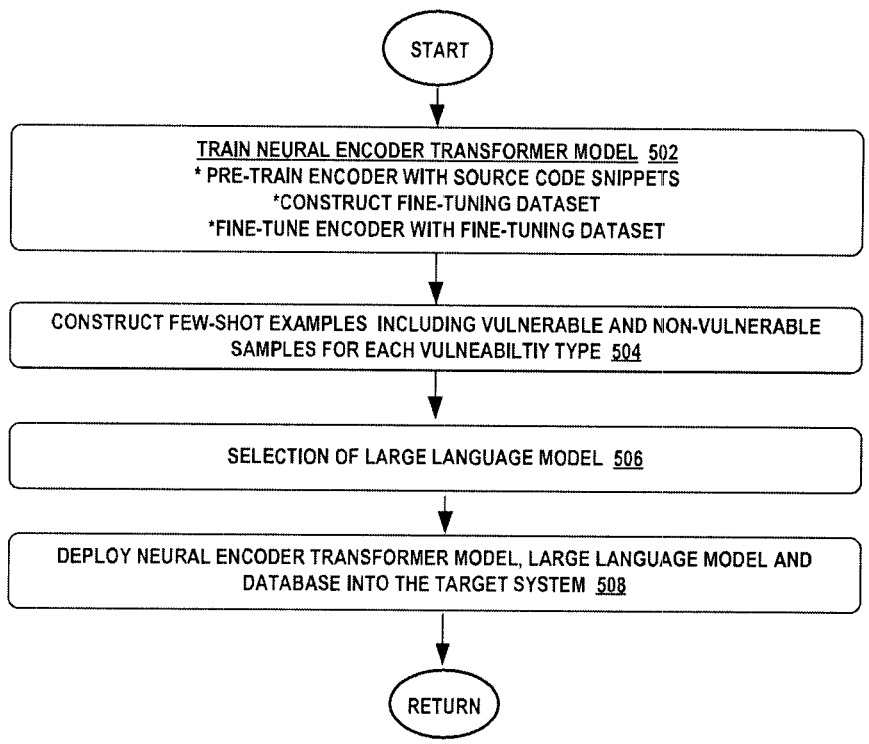
FIG. 5 is a flow diagram illustrating an exemplary method of the vulnerability detection and repair system.

FIG. 5 illustrates an exemplary method of the vulnerability detection and repair system.

Initially, the neural encoder transformer model with attention is trained for software vulnerability detection classification. The neural encoder transformer model is pre-trained on an unsupervised training dataset of source code snippets. A fine-tuning dataset is generated and then the neural encoder transformer model with attention is trained with the fine-tuning dataset. The model learns to predict the token positions of an input sequence that are associated with one of the software vulnerability classes and the type of software vulnerability (Collectively, block 502).

Neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 502).

A neural transformer model has multiple blocks and layers within each block so that more detailed relationships within the data are learned as well as how the features interact with each other on a non-linear level. The model architecture, training procedure, data normalization and vocabulary encoding procedures are hyperparameters that are tailored to meet a particular objective. The parameters of a model are the values of the model, such as the attention weights (K, V, Q) and the token embeddings (We, Wp). The hyperparameters influence the way the model is built and how the parameters are learned. (Collectively, block 502).

For each sequence of each batch of each epoch, the T-ordered sequences of tokens are then mapped into numeric vectors and then into respective token embeddings and positional embeddings. An embedding is a learned representation for the text-based tokens where tokens that have a common meaning have a common representation. An embedding is a mapping of discrete categorical variables to a vector of continuous numbers. There is an embedding for each token in the vocabulary and a corresponding positional embedding. The token embedding represents the learned representation for the token. The neural transformer model does not read each token sequentially and as such, has no knowledge of the token's position in a sequence without additional position information. The positional embedding is used to embed position information about a token's position in a sequence into a respective neural transformer model. (Collectively, block 502).

Initial values are generated for the token embedding and positional embeddings of each sequence which are then used to form a context tensor. Thereafter, the neural transformer model learns the values for each embedding. Upon the completion of the training phase, the embeddings for each token and the positional embeddings are saved into respective matrices for later use (i.e., embedding store 440, 442). There is a token embedding matrix, We, that contains an embedding vector for each token $t_i$, $i=0 \ldots V$, and a positional embedding matrix, Wp, that contains an embedding vector $P_j$, $j=0 \ldots T$, for each position, where V is the size of the vocabulary and T is the length of the token sequence. (Collectively, block 502).

The context tensor is input into a respective neural encoder transformer model and passed through the multiple layers of the neural encoder transformer model. The masked self-attention layer takes the context tensor as input and passes it through the multiple layers of self-attention, layer normalization and feed-forward neural network of each encoder block to finally produce a set of hidden representations. (Collectively, block 502).

The feed-forward neural networks in the encoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation algorithm may be used to update the weights. (Collectively, block 502).

At the completion of each batch, the parameters of a respective neural transformer model are updated at a preconfigured frequency denoted as Naccum. Naccum is a gradient accumulation frequency. The parameters include the token embeddings and the positional embeddings which are stored in a respective embedding matrix. (Collectively, block 502).

The neural transformer model is then validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 502).

Next, a few-shot database is constructed using the results of the static analyzer on a source code repository or codebase. The few-shot examples include vulnerable code having an identified vulnerability type and non-vulnerable code. (Collectively, block 504).

A large language model is selected for the vulnerability detection task. The large language model may be selected based on several factors, such as without limitation, the configuration of the neural transformer model, the number of encoder/decoder blocks of the model, the type of pre-training data, the cost of using the model, the size of the model, and so forth. (Collectively, block 506).

The neural encoder transformer model, the few-shot example database, and the large language model are then deployed into a target system. The target system may be an IDE or source code editor as shown in FIG. 3A, a source code version control system as shown in FIG. 3B, or other application. (Collectively, block 508).

Figure 6:
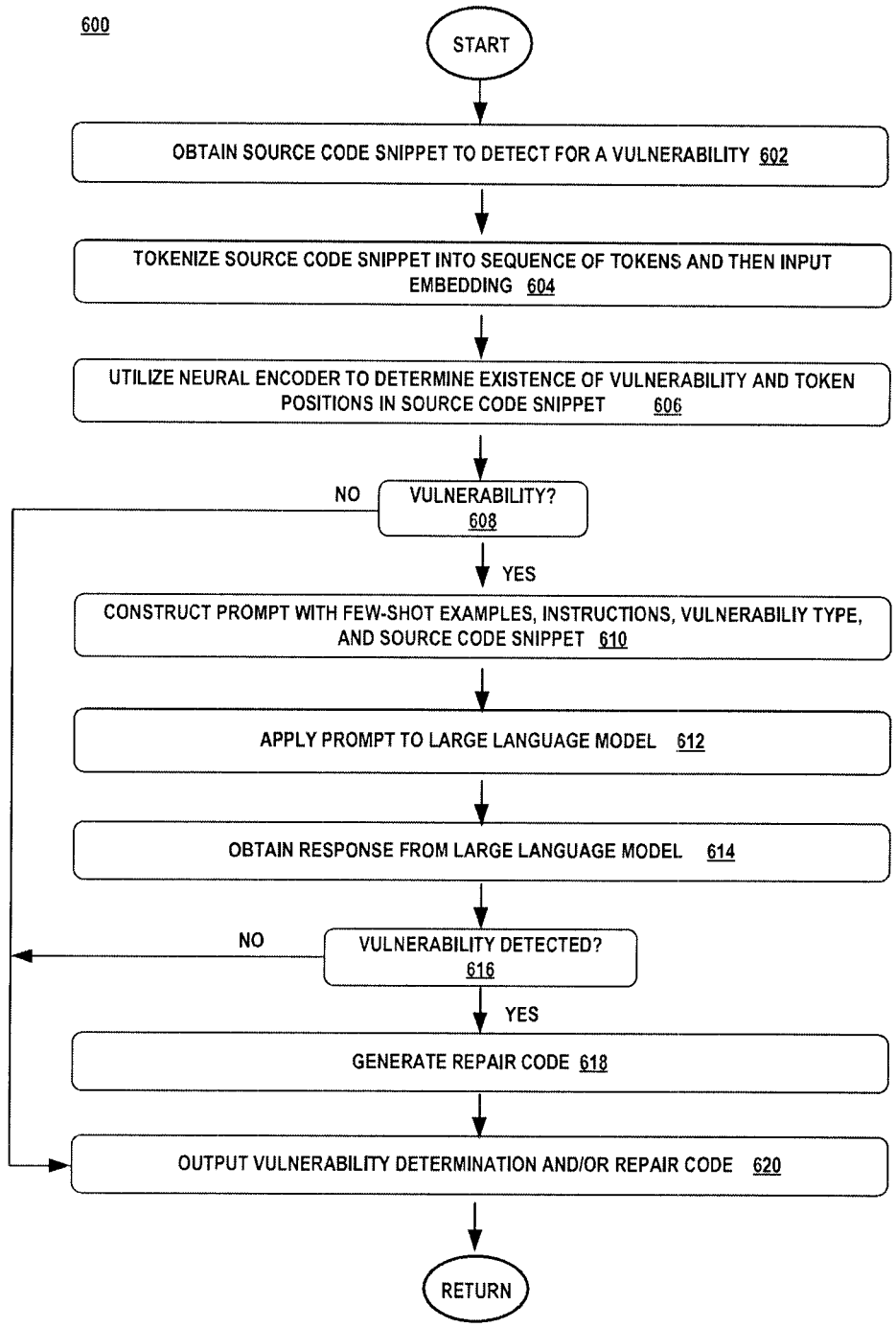
FIG. 6 is a flow diagram illustrating an exemplary method of the inference phase of the vulnerability detection and repair system.

Attention now turns to a description of the inference phase. Turning to FIG. 6, there is shown an exemplary method of the vulnerability detection and repair system 600. The method receives a source code snippet to analyze for a vulnerability (block 602). The source code snippet is parsed into a syntax tree from which tokens are extracted to generate an input sequence of tokens of length T (block 604). Each token in the input sequence is replaced with a corresponding token embedding and the sequence of embeddings is applied to the neural encoder transformer model with attention (block 604).

The context tensor containing the input embedding and position embeddings are applied to the neural encoder model with attention. The model outputs a probability distribution for each token position of the input sequence and for each vulnerability type (Collectively, block 606).

If the neural encoder transformer model indicates a vulnerability type (block 608—yes), the prompt generator generates a prompt for the large language model (block 610). The prompt includes the vulnerable source code snippet, instructions, the type of software vulnerability, and a few-shot examples (block 610). The prompt is input to the large language model (block 612) and a response is received from the large language model (block 614).

If the response from the large language model indicates a vulnerability (block 616—yes), then repair code may be generated for the vulnerable source code snippet (block 618) and output in the target system with the vulnerability prediction (block 620). Otherwise (block 616—no, 608—no), the vulnerability determination is output in the target system (block 620).

FIG. 7 illustrates an exemplary prompt 700. The prompt is in the form of a conversation that includes instructions to the model that describe the task for the model and the output format of the response 702. As shown in prompt 700, the instructions 702 instruct the large language model on the software vulnerability detection task for a specific type of vulnerability, such as the hardcoded-credential vulnerability. The instructions 702 describe the hardcoded-credential vulnerability, as passwords, secrets or tokens stored in plaintext directly in the source code. The instructions 702 also indicate the output format from the large language model which is to be "Yes" or "No".

The prompt then includes several few-shot examples 704 which include positive and negative examples. Vulnerable Source Code #1 includes a source code snippet that is not a hardcoded-credential since there is a name of a secret but not its value. Vulnerable Source Code #2 includes a source code snippet that is a hardcoded-credential since there is a secret value, password or token in the source code snippet. The prompt then includes the source code snippet 706 for the large language model to evaluate which is a line of source code which includes the secret value, FieldValidation: EmpGuideClientSecret.

Technical Effect

Aspects of the subject matter disclosed herein pertain to the technical problem of identifying a type of software vulnerability and the tokens that contain the vulnerability. The technical features associated with addressing this problem is a classifier model and a large language model. The classifier model is trained to detect specific types of vulnerabilities and the tokens of an input sequence attributable to the identified vulnerability. The large language model detects the vulnerability given the vulnerable source code and the identified vulnerability. The technical effect achieved is an accurate detection of the vulnerable code before the code is released.

The operations used in this technique, such as the creation of the fine-tuning dataset, the training of the neural encoder transformer model with attention, the generation of the few-shot examples, and the detection process using both models, needs to be performed on a computing device. Hence, the operations performed are inherently digital. A human mind cannot interface directly with a CPU, or network interface card, or other processor, or with RAM or digital storage, to read and write the necessary data and perform the necessary operations and processing steps taught herein.

Embodiments are also presumed to be capable of operating "at scale", that is capable of handling larger volumes, in production environments or in testing labs for production environments as opposed to being mere thought experiments.

Additionally, the technique presented herein is an improvement over prior solutions that required an entire program or codebase to be built and compiled in order to perform a detection analysis. The technique described herein operates on any portion of a source code program, without requiring access to the entire program which may not be possible, and without building and compiling the entire program.

Exemplary Operating Environment

Figure 8:
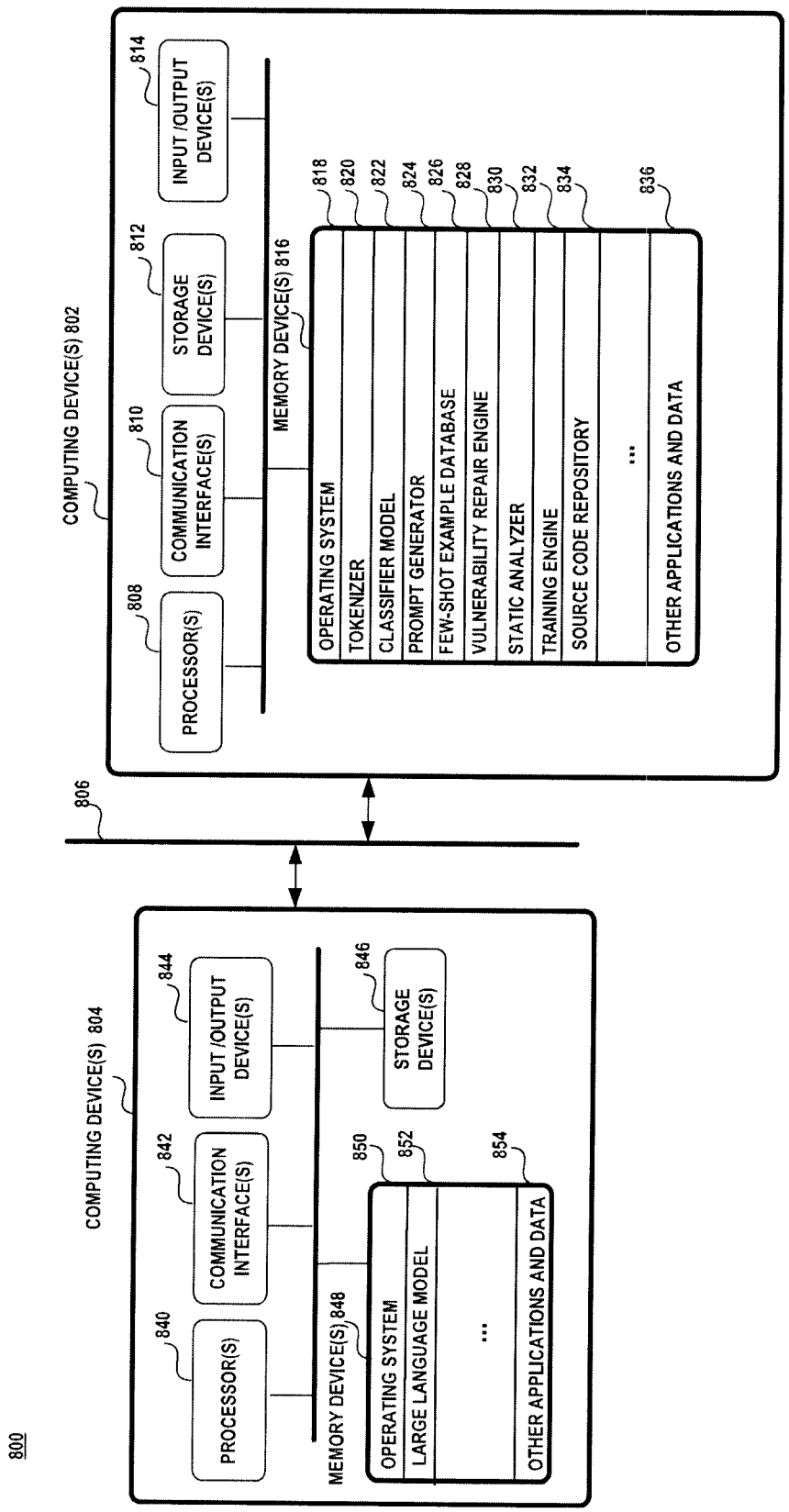
FIG. 8 is a block diagram illustrating an exemplary operating environment.

Attention now turns to a discussion of an exemplary operating environment. FIG. 8 illustrates an exemplary operating environment 800 in which one or more computing devices 802, 804 are used in a vulnerability detection and repair system. In one aspect, a portion of the processing is performed on computing device 802 and the large language model exists on computing device 804. However, it should be noted that the aspects disclosed herein are not constrained to any particular configuration of devices and the entire technique may be performed on a single computing device.

The computing devices 802, 804 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 800 may be configured in a network environment, a distributed environment, a multi-processor environment, or a stand-alone computing device having access to remote or local storage devices.

The computing devices 802, 804 may include one or more processors 808, 840, one or more communication interfaces 810, 842, one or more storage devices 812, 846, one or more input/output devices 814, 844, and one or more memory devices 816, 848. A processor 808, 840 may be any commercially available or customized processor and may include dual microprocessors and multi-processor architectures. A communication interface 810, 842 facilitates wired or wireless communications between the computing devices 802, 804 and other devices. A storage device 812, 846 may be computer-readable medium that does not contain propagating signals, such as modulated data signals transmitted through a carrier wave. Examples of a storage device 812, 846 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 812, 846 in the computing devices 802, 804. The input/output devices 814, 844 may include a keyboard, mouse, pen, voice input device, touch input device, display, speakers, printers, etc., and any combination thereof.

A memory device 816, 848 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 816, 848 may also include one or more external storage devices or remotely located storage devices that do not pertain to propagated signals, such as modulated data signals transmitted through a carrier wave.

The memory device 816, 848 may contain instructions, components, and data. A component is a software program that performs a specific function and is otherwise known as a module, program, component, and/or application. The memory device 816 may include an operating system 818, a tokenizer 820, a classifier model 822, a prompt generator 824, a few-shot example database 826, a vulnerability repair engine 828, a static analyzer 830, a training engine 832, a source code repository 834, and other applications and data 836. The memory device 848 may include an operating system 850, a large language model 852, and other applications and data 854.

The computing devices 802, 804 may be communicatively coupled via a network 806. The network 806 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 806 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra-Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed comprising a processor; and a memory. The memory stores one or more programs that are configured to be executed by the processor. The one or more programs including instructions that perform acts to: identify a type of software vulnerability in a source code snippet and tokens in the source code snippet attributable to the software vulnerability, wherein the source code snippet is a portion of a software program; generate a prompt to a large language model to determine if the source code snippet contains the identified type of software vulnerability, wherein the prompt includes a few-shot example of the type of software vulnerability and the source code snippet, wherein the few-shot example comprises tokens associated with the identified type of software vulnerability; and obtain a response from the large language model, given the prompt, wherein the response indicates whether the source code snippet contains the identified type of software vulnerability.

In an aspect, the one or more programs include instructions that perform acts to: access a neural encoder transformer model with attention trained to predict a plurality of software vulnerabilities; and apply the source code snippet to the neural encoder transformer model with attention to obtain the identified type of software vulnerability. In an aspect, the neural encoder transformer model with attention is trained to predict tokens in the source code snippet attributable to the identified type of software vulnerability. In an aspect, the one or more programs including instructions that perform acts to: obtain a request from a source code editor to determine if the source code snippet has a software vulnerability.

In an aspect, the one or more programs including instructions that perform acts to: obtain a request from a version-controlled source code repository to determine if the source code snippet has a software vulnerability. In an aspect, the large language model is a neural transformer model with attention. In an aspect, the neural transformer model with attention comprises decoder blocks.

A computer-implemented method is disclosed, comprising: detecting a software vulnerability in a source code snippet and tokens in the source code snippet attributable to the software vulnerability, wherein the detected software vulnerability is associated with a type, wherein the source code snippet includes a fixed-length portion of a source code program; obtaining a plurality of few-shot examples having the detected software vulnerability type, wherein a first few-shot example of the plurality of few-shot examples includes a first source code snippet having the detected software vulnerability type, wherein a second few-shot example of the plurality of few-shot examples includes a second source code snippet without the detected software vulnerability type; creating a prompt to a large language model for the large language model to predict whether the source code snippet contains the detected software vulnerability type, wherein the prompt includes the plurality of few-shot examples of the detected software vulnerability type and the source code snippet; and obtaining a response from the large language model, given the prompt, wherein the response indicates whether the source code snippet contains the detected software vulnerability type.

In an aspect, the computer-implemented method further comprises: extracting a fixed-length sequence of tokens from the source code snippet; and classifying whether each position of the fixed-length sequence is associated with the detected software vulnerability type. In an aspect, classifying whether each position of the fixed-length sequence is associated with the detected software vulnerability type is performed by a neural encoder transformer model with attention.

In an aspect, the computer-implemented method, further comprises: receiving the source code snippet from an integrated development environment. In an aspect, the computer-implemented method, further comprises: receiving the source code snippet from a pull request. In an aspect, the computer-implemented method further comprises: generating repair code to alleviate the detected software vulnerability. In an aspect, the large language model comprises a neural transformer model with attention. In an aspect, the neural transformer with attention includes a decoder block.

A second computer-implemented method is disclosed, comprising: accessing a classifier model to determine whether a source code snippet contains a software vulnerability and a type of the software vulnerability, wherein the classifier model is given a fixed-length token sequence representing the source code snippet and outputs a probability for each type of a plurality of software vulnerabilities and for each token position in the source code snippet; upon the classifier model determining that the source code snippet contains the software vulnerability, accessing a large language model to predict whether the source code snippet includes the type of software vulnerability given the source code snippet and a few-shot example, wherein the few-shot example comprises a first source code sample having the type of software vulnerability; and upon the large language model predicting that the source code snippet includes the type of software vulnerability, generating repair code for the source code snippet.

In an aspect, the few-shot example comprises a second source code sample without the type of software vulnerability. In an aspect, the computer-implemented method further comprises: receiving the source code snippet from a software development tool. In an aspect, the computer-implemented method, further comprises: receiving the source code snippet from a version-controlled source code repository. In an aspect, the large language model comprises a neural transformer model with attention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
   detecting a software vulnerability in a source code snippet and positions of tokens in the source code snippet attributable to the software vulnerability, wherein the detected software vulnerability is associated with a type, wherein the source code snippet includes a fixed-length portion of a source code program;
   obtaining a plurality of few-shot examples comprising a first few-shot example and a second few-shot example, wherein the first few-shot example of the plurality of few-shot examples comprises a first source code snippet having the type of the detected software vulnerability, wherein the second few-shot example of the plurality of few-shot examples includes a second source code snippet without the detected software vulnerability;
   creating an input to a large language model for the large language model to determine whether the source code snippet contains the detected software vulnerability, wherein the input includes the plurality of few-shot examples, the detected software vulnerability, the positions of the tokens in the source code snippet attributable to the detected software vulnerability, and the source code snippet;
   obtaining a response from the large language model, given the input, wherein the response indicates whether the source code snippet contains the detected software vulnerability; and
   upon the large language model identifying the detected software vulnerability in the source code snippet, generating repair code to remedy the detected software vulnerability in the source code snippet.

2. The computer-implemented method of claim 1, further comprising:
   extracting a fixed-length sequence of tokens from the source code snippet; and
   classifying whether each position of the fixed-length sequence is associated with the detected software vulnerability type.

3. The computer-implemented method of claim 2, wherein classifying whether each position of the fixed-length sequence is associated with the detected software vulnerability type is performed by a neural encoder transformer model with attention.

4. The computer-implemented method of claim 1, further comprising:
   receiving the source code snippet from an integrated development environment.

5. The computer-implemented method of claim 1, further comprising:
   receiving the source code snippet from a pull request.

6. The computer-implemented method of claim 1, further comprising:
   causing the large language model to generate the repair code to correct the detected software vulnerability.

7. The computer-implemented method of claim 1, wherein the large language model comprises a neural transformer model with attention.

8. The computer-implemented method of claim 7, wherein the neural transformer with attention includes a decoder block.

9. A system comprising:
a processor; and
a memory that stores a program that is configured to be executed by the processor, the program comprising instructions that perform acts to:
identify in a source code snippet a software vulnerability, a type of the software vulnerability and positions of tokens in the source code snippet attributable to the software vulnerability;
obtain a plurality of few-shot examples comprising a first few-shot example and a second few-shot example, wherein the first few-shot example of the plurality of few-shot examples comprises a first source code snippet having the type of the software vulnerability, wherein the second few-shot example of the plurality of few-shot examples includes a second source code snippet with no software vulnerability;
generate an input to a large language model for the large language model to determine whether the source code snippet contains the software vulnerability, wherein the input includes the plurality of few-shot examples, the software vulnerability, the positions of the tokens in the source code snippet attributable to the software vulnerability, and the source code snippet;
receive a response from the large language model, given the input, wherein the response indicates that the source code snippet contains the software vulnerability; and
obtain from the large language model repair code to remedy the software vulnerability in the source code snippet.

10. The system of claim 9, wherein the program comprises instructions that perform acts to:
access a neural encoder transformer model with attention trained to predict a plurality of software vulnerabilities; and
determine from the neural encoder transformer model with attention the software vulnerability in the source code snippet and the positions of tokens in the source code snippet attributable to the software vulnerability.

11. The system of claim 9, wherein the neural encoder transformer model with attention is trained on a dataset comprising labeled samples, wherein the labeled samples comprise source code samples having a known software vulnerability and source code having no software vulnerability.

12. The system of claim 9, wherein the program comprises instructions that perform acts to:
obtain a request from a source code editor to determine if the source code snippet has the software vulnerability.

13. The system of claim 9, wherein the program comprises instructions that perform acts to:
obtain a request from a version-controlled source code repository to determine if the source code snippet has a software vulnerability.

14. The system of claim 9, wherein the large language model is a neural transformer model with attention.

15. The system of claim 14, wherein the neural transformer model with attention comprises decoder blocks.

16. A hardware storage device having stored thereon computer executable instructions that are structured to be executable by a processor of a computing device to thereby cause the computing device to perform actions that:
identify a software vulnerability in a source code snippet and positions of tokens in the source code snippet attributable to the software vulnerability, wherein the software vulnerability is associated with a type;
obtain a plurality of few-shot examples comprising a first few-shot example and a second few-shot example, wherein the first few-shot example of the plurality of few-shot examples comprises a first source code snippet having the type of the software vulnerability, wherein the second few-shot example of the plurality of few-shot examples includes a second source code snippet with no software vulnerability;
determine from a large language model, given an input comprising the plurality of few-shot examples, the type of the software vulnerability, the positions of the tokens in the source code snippet attributable to the detected software vulnerability, and the source code snippet, that the source code snippet has the software vulnerability; and
instruct the large language model to generate repair code to remedy the software vulnerability in the source code snippet.

17. The hardware storage device of claim 16 having stored thereon computer executable instructions that are structured to be executable by the processor of the computing device to thereby cause the computing device to perform actions that:
access a classifier, trained to detect a plurality of software vulnerabilities from source code, to determine whether the source code snippet contains one of the plurality of software vulnerabilities.

18. The hardware storage device of claim 16, wherein the classifier is trained on a plurality of labeled samples comprising a first set of source code samples having one of a plurality of software vulnerabilities and a second set of source code samples with none of the plurality of software vulnerabilities.

19. The hardware storage device of claim 16 having stored thereon computer executable instructions that are structured to be executable by the processor of the computing device to thereby cause the computing device to perform actions that:
receive a request from a source code editor to determine if the source code snippet has a software vulnerability.

20. The hardware storage device of claim 16 having stored thereon computer executable instructions that are structured to be executable by the processor of the computing device to thereby cause the computing device to perform actions that:
receive a request from a version-controlled source code repository to determine if the source code snippet has a software vulnerability.

* * * * *